US00RE44212E

(19) United States
(12) Reissued Patent
Brochu

(10) Patent Number: US RE44,212 E
(45) Date of Reissued Patent: May 14, 2013

(54) GUTTER GUARD

(76) Inventor: Guy Brochu, Quebec (CA)

(21) Appl. No.: 12/315,248

(22) Filed: Dec. 1, 2008

Related U.S. Patent Documents

Reissue of:
(64) Patent No.: 7,143,549
Issued: Dec. 5, 2006
Appl. No.: 10/635,830
Filed: Aug. 6, 2003

(51) Int. Cl.
*E04D 13/00* (2006.01)

(52) U.S. Cl.
USPC ..... 52/12

(58) Field of Classification Search ..... 52/11, 12
See application file for complete search history.

(56) References Cited

U.S. PATENT DOCUMENTS 2,613,621 A * 10/1952 Schraeder ..... 52/12
4,553,356 A * 11/1985 Pepper ..... 52/11
4,941,299 A * 7/1990 Sweers ..... 52/12
5,189,849 A * 3/1993 Collins ..... 52/12
5,557,891 A * 9/1996 Albracht ..... 52/12
5,848,857 A * 12/1998 Killworth et al. ..... 405/118
6,427,388 B1 * 8/2002 Brochu ..... 52/12
6,598,352 B2 * 7/2003 Higginbotham ..... 52/12
2002/0073631 A1 * 6/2002 Baker ..... 52/12
2002/0100223 A1 * 8/2002 Brochu ..... 52/12
2003/0110712 A1 * 6/2003 Brochu ..... 52/12

* cited by examiner

*Primary Examiner* — Brian Glessner
*Assistant Examiner* — Adriana Figueroa
(74) *Attorney, Agent, or Firm* — Eric Fincham

(57) ABSTRACT

A device for protecting a gutter having a rear wall, front wall and a bottom wall, the walls defining a trough there between, the device comprising a guard member having generally planar central portion with one side thereof having an inverted U-shaped configuration designed to fit over an upper marginal edge of the rear wall of the gutter while at the other side, there is provided an overflow wall. The guard and gutter are attached directly to a supporting structure by means of screws or other mechanical fastening devices.

8 Claims, 4 Drawing Sheets

GUTTER GUARD

Matter enclosed in heavy brackets [ ] appears in the original patent but forms no part of this reissue specification; matter printed in italics indicates the additions made by reissue.

FIELD OF THE INVENTION

The present invention relates to a shield for a rain water gutter assembly also known as an eaves trough.

BACKGROUND OF THE INVENTION

The use of shields for gutters or eaves troughs is well know in the prior art and many patents have issued for different types of shields. The purpose of the gutter shield is essentially to permit passage of rain water from the roof to the gutter or eaves trough while protecting the same from extraneous foreign matter such as leaves and the like, which could lead to clogging.

In practice, the use of a shield or a guard comprises a member which is apertured and permits the passage of rain water while banning the passage of extraneous material into the gutter. The shields or guards are attached in various manners to a portion to the gutter. However, many of these guards do not function as desired and access must still be had to the eaves trough for cleaning purposes.

It is also been proposed in the art to provide relatively complex structures wherein the eaves troughs are mounted for rotatable movement such that they may be emptied at desired intervals.

It is also being proposed to provide gutters which are designed to have a cover with an outer edge which curls downwardly and the water flow follows the curved portion due to its own surface tension to cascade into the eaves trough which is situated below. All extraneous material would theoretically fall to the ground. However, this concept does not always work when the volume of water becomes sufficiently large so that the surface tension is not sufficient to cause all the water to flow into the gutter. Consequently, there is an overflow.

SUMMARY OF THE INVENTION

It is an object of the present invention to provide a novel gutter guard which is securely fixed to the eaves trough on both sides thereof and which forwards the rain water into the gutter, but excludes virtually all foreign matter.

According to one aspect of the present invention, there is provided a device for protecting a gutter wherein the gutter has a rear wall, a front wall and a bottom wall, the walls defining a trough therebetween, the device comprising a guard member having an elongated configuration with a generally planar central portion, first and second longitudinally extending opposed sides located on either side of the generally planar central portion, a plurality of apertures extending through the generally planar central portion, the first side of the guard member having an inverted U-shaped portion designed to fit over an upper marginal edge of the rear wall of the gutter, the U-shaped portion comprising an inner vertical wall and an outer vertical wall, an inturned flange located at the bottom of the outer wall to form a second generally U-shaped portion with the inturned flange being adjacent an inner face of the gutter, the second side of the guard member having an overflow wall extending vertically upward, a generally horizontal portion extending outwardly from an upper end of the overflow wall, and an inturned flange at a distal end of the horizontal portion adjacent the underside of the horizontal portion According to a further aspect of the present invention, there is provided a device to protect the gutter wherein the gutter has a rear wall, a front wall, and a bottom wall, the walls defining a trough there between, the device comprising a guard member having an elongated configuration with a generally planer central portion, first and second longitudinally extending sides located on either side of the generally planer central portion, a plurality of apertures extending through the generally planer central portion, the first side of the guard member having an upwardly extending wall segment, a U-shaped portion being connected to the upwardly extending wall segment, a flexible sealing member extending outwardly from the U-shaped portion, the second side of the guard member having an overflow wall extending vertically upwardly, a generally horizontal portion extending outwardly from an upper end of the overflow wall, and an inturned flange at the distal end of the horizontal portion, the inturned flange being adjacent to the underside of the horizontal portion.

In a still further aspect of the present invention, there is provided a device to protect the gutter wherein the gutter has a rear wall, a front wall, and a bottom wall, the walls defining a trough there between, the device comprising a guard member having an elongated configuration with a generally planer central portion, first and second longitudinally extending sides located on either side of the generally planer central portion, a plurality of apertures extending through the generally planer central portion, a longitudinally extending flexible sealing member secured to the first of the guard member, the flexible sealing member extending upwardly and outwardly therefrom, the second side of the guard member having an overflow wall extending generally vertically upwardly, and a horizontal portion extending outwardly from an upper end of the overflow wall, the horizontal portion being designed to rest on the gutter.

The device of the present invention provides a guard for the eaves trough to prevent foreign matter from entering into the eaves trough. This is achieved by means of appropriate sizing of the apertures formed therein. In this respect, the aperture size and aperture placement must permit adequate drainage of the water through the apertures into the eaves trough while substantially excluding any foreign matter which remains on the top and which normally would be removed by the element of wind and the like. Adequate sizing of the apertures will prevent clogging of the device.

The apertures preferably extend in diagonal rows or lines at an angle with respect to the gutter length. In preferred embodiments, the apertures have an aperture size of between 2.5 and 10 mm and even more preferably between 3.0 and 4.0 mm. As the apertures are arranged in diagonal rows, they are also preferably arranged in longitudinally extending rows.

In a longitudinally extending row, the apertures are spaced apart by a distance of between 10 and 15 mm while in a diagonal row, they are spaced apart by a distance of between 5 and 10 mm.

As will be appreciated, during a period of heavy rain, the drainage might not be instantaneous and accordingly, there is preferably provided a vertically extending wall adjacent the front wall of the gutter to prevent overflow.

In the first aspect of the invention, there is provided a device which may be supplied in various lengths such that it may be retrofitted to a gutter and/or done by the do-it yourselfer. To this end, there may be provided a connecting member for interconnecting the lengths as they are installed.

In the first embodiment, the device is secured to the gutter by mechanical fastening means while the gutter itself is also secured to the supporting structure by mechanical fastening means such as screws.

In the present invention, the device may be provided with a flexible sealing strip which is retained by the device and is designed above the adjoining structure to prevent water seeping between the gutter and support structure.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
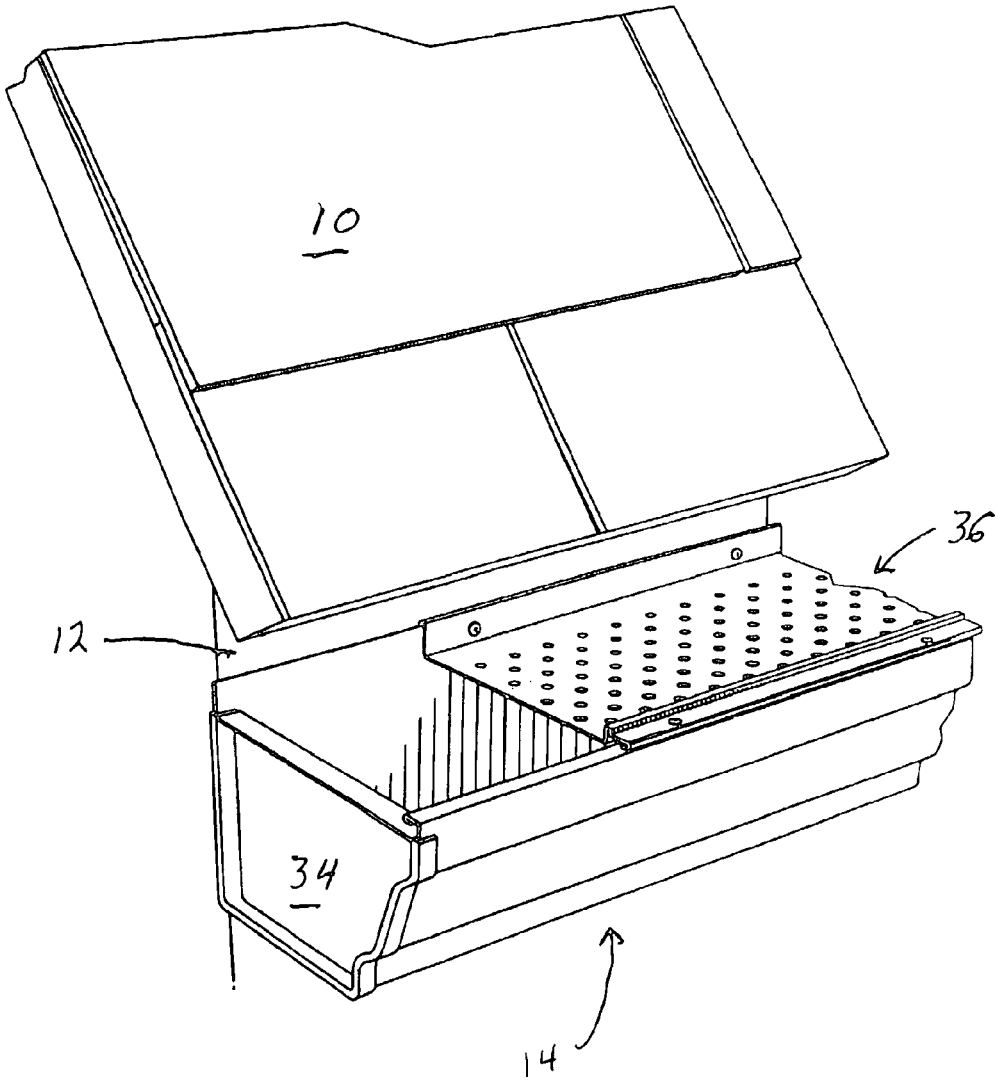
FIG. 1 is a perspective view of a gutter guard and an associated gutter mounted on a supporting structure.
Figure 2:
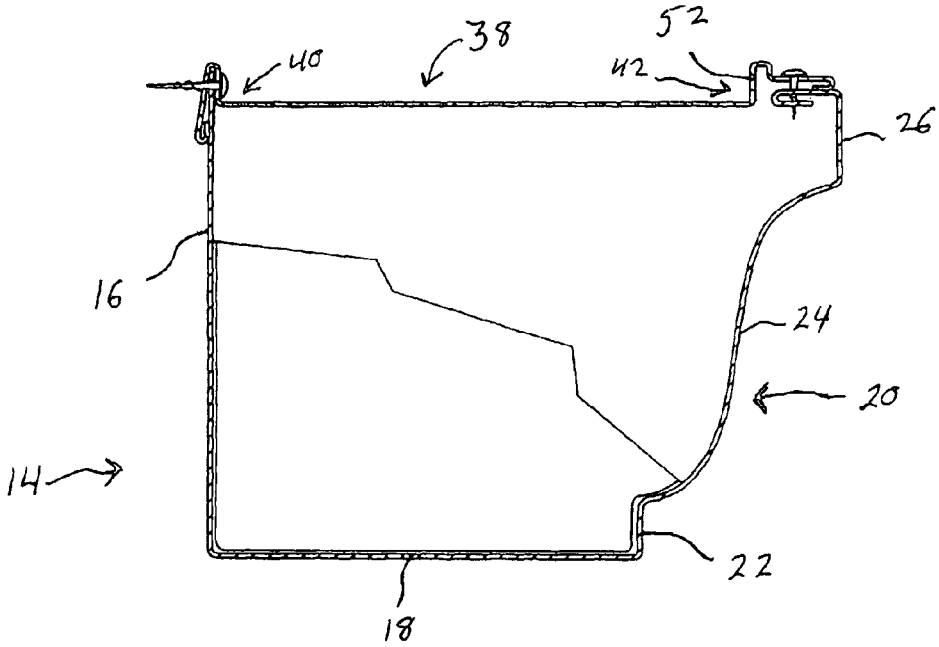
FIG. 2 is a cross-sectional view through the gutter and gutter guard.

Referring to the drawings in a greater detail and by reference characters thereto, there is illustrated in FIG. 1 a portion of a gutter generally designated by reference numeral 14 and which is attached to a supporting structure 12 to receive run-off from roof 10.

Figure 3:
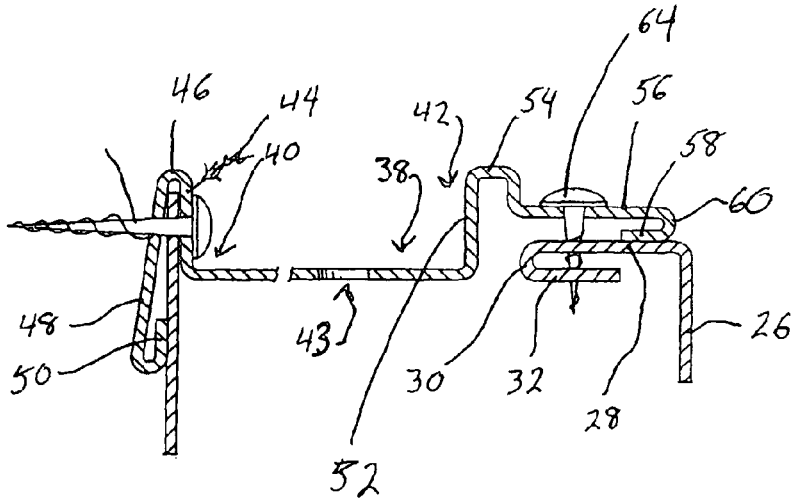
FIG. 3 is a detailed sectional view of the upper portion of the gutter guard showing attachment thereof.

Gutter 14 is of a conventional design which is widely available in the market place and has a back wall 16 which is designed to lie substantially adjacent to the supporting structure 12. Extending between a front row 20 and back wall 16 is a bottom 18. Front wall 20 includes a lower vertical segment 22, a central arcuate segment 24 and upper vertical segment 26. As may be best seen in FIG. 3, at the upper end of upper vertical segment 26, there is provided an inwardly extending flange 28 and a reversely extending lower flange 32 connected thereto by means of a bight 30. As seen in FIG. 1, a conventional end cap 34 is utilized to seal the end of gutter 14.

According to this embodiment of the present invention, there is provided a gutter guard which is generally designed by reference numeral 36 which has a central mean planer portion 38 extending the length of gutter 14. Main central portion 38 has a first side 40, approximate back wall 16 and a second side generally designated by reference numeral 42 approximate front wall 20. Central planer portion 38 is provided with a plurality of apertures 43 which, as may seen, extend in diagonal rows in an angle of 45 degrees with respect to the length of gutter guard 36.

At first side 40, gutter guard 36 has an inner vertical wall 44 and an outer vertical 48 connected by a bight 46. In turn, at the lower of outer vertical wall 48, there is provided an inturned flange 50.

At the second side 42 of gutter guard 36, there is provided a vertical overflow wall 52 which is designed to prevent overflow during periods of heavy rain. Vertical overflow wall 52 terminates in a bight 54 which connects with an horizontal segment 56. In turn, horizontal section 56 continues on through bight 60 and terminates in an inturned flange 58.

Screws 62 are used to secure both the gutter 14 and gutter guard 36 to supporting structure 12. Thus, it may seen in FIG. 3, a screw 62 will extend through both inner vertical wall 44 and outer vertical 48 of gutter guard 36 and also thru back wall 16 of gutter 14. The inturned flange 50 helps maintain proper tension on the device.

Similarly, screws 64 are used at the second side 42 to secure gutter guard 36 to gutter 14. Again, the use of inturned flange 58 helps prevent loosening of the screws 64.

Figure 4:
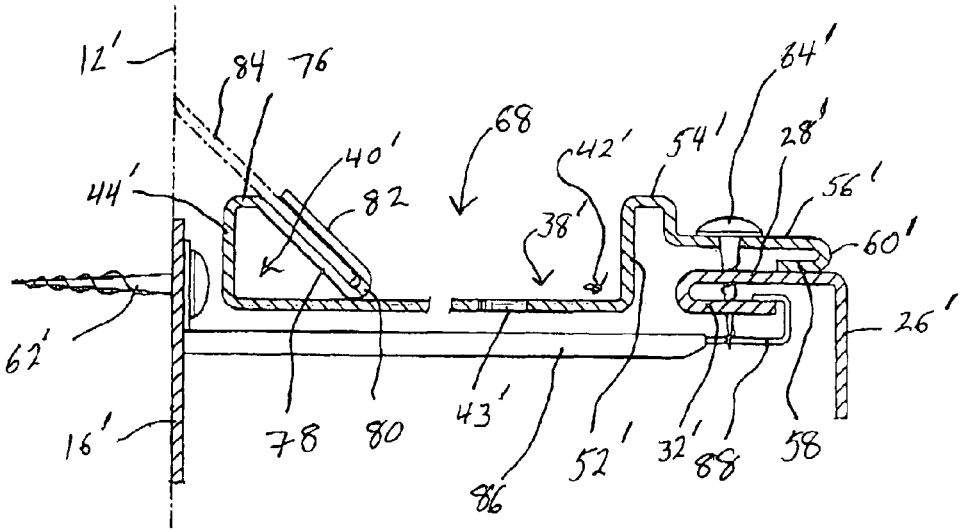
FIG. 4 is a cross-sectional view of a further embodiment of the present invention, the view illustrating the gutter guard and means of attachment.
Figure 5:
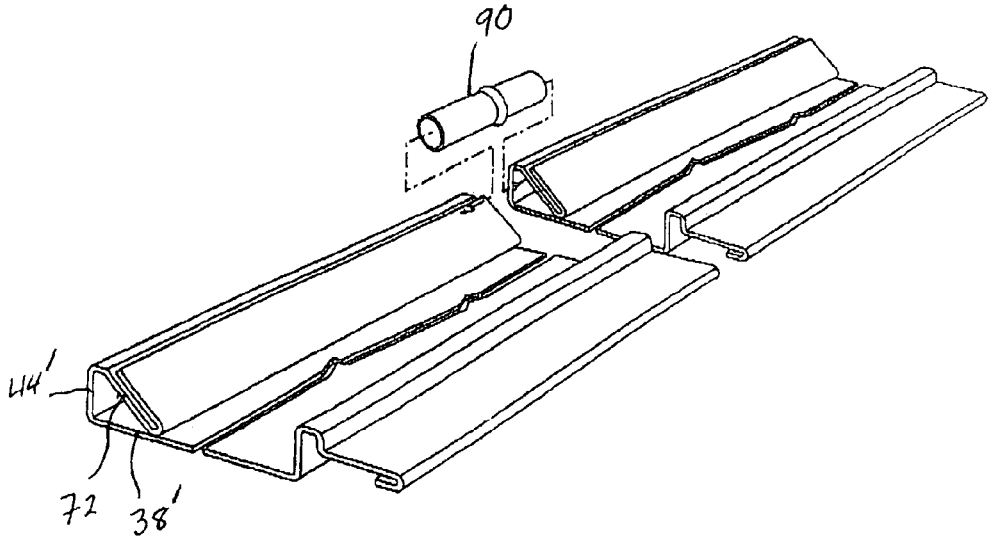
FIG. 5 is a perspective view of the embodiment of FIG. 4.

Turning to the embodiment illustrated in FIGS. 4 and 5, similar reference numerals with a prime are utilized for similar components. There is provided a gutter guard member generally designated by reference numeral 68 to be used in conjunction with a gutter (only a portion shown) having a back wall 16' and the upper vertical segment 26' of a gutter front wall. Gutter guard 68 includes a central planer portion 38' having a first side 40' and a second side 42'. Apertures 43' extend through the central planer portion 38'.

At the first side 40', gutter guard 68 has an inner vertical wall 44'. However, at the upper end of inner vertical wall 44', there is provided a top wall segment 76 and then a downwardly angled segment 78. By means of bight 80, there is also provided an upwardly angled segment 82. Downwardly angled segment 78 and upwardly angled segment 82 form a U-shaped configuration which are designed to receive one end of a sealing element 84 with the other end thereof being abutted against supporting structure 12'.

At the second side 42', guard member 68 has a structure substantially identical to that of gutter guard 36. Thus, there is provided a vertical overflow wall 52', a bight 54', and a horizontal segment 56'. At the distal end of horizontal segment 56', there is provided an inturned flange 58' which is connected thereto by means of a bight 60'.

As with the case of the previously described embodiment, a screw 62' is utilized to secure back wall 16' to supporting structure 12'. However, this embodiment also provides for a hook member 86 having a U-shaped portion 88 at one end thereof. Hook 86 is also attached by means of a screw 62 while hook 86 engages in the portion between upper inwardly extending flange 28' and lower flange 32'. It will also be noted that screw 64' is utilised to retain guard 68 in place as in the previously described embodiment.

As the guard 68 may be provided in a plurality of pieces for retrofitting, a connector 90 may be utilized which fits within the space defined by downwardly angled segment 72, inner vertical wall 44', and a central planar portion 38'.

Figure 6:
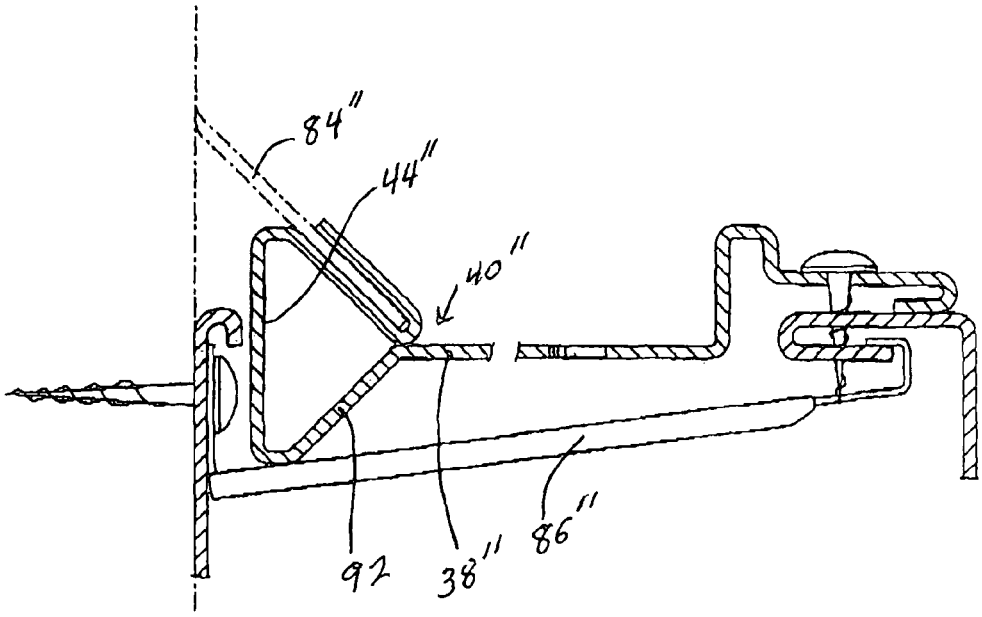
FIG. 6 is a cross-sectional view similar to FIG. 4 showing a modified version of the gutter guard.

A slightly modified arrangement of the embodiment of FIGS. 4 and 5 is shown in FIG. 6. In this arrangement, it will be noted that hook 86" is somewhat angled while after the first side 40", there is provided a downwardly angled wall segment 92 between planar portion 38" and inner vertical wall 44".

Figure 7:
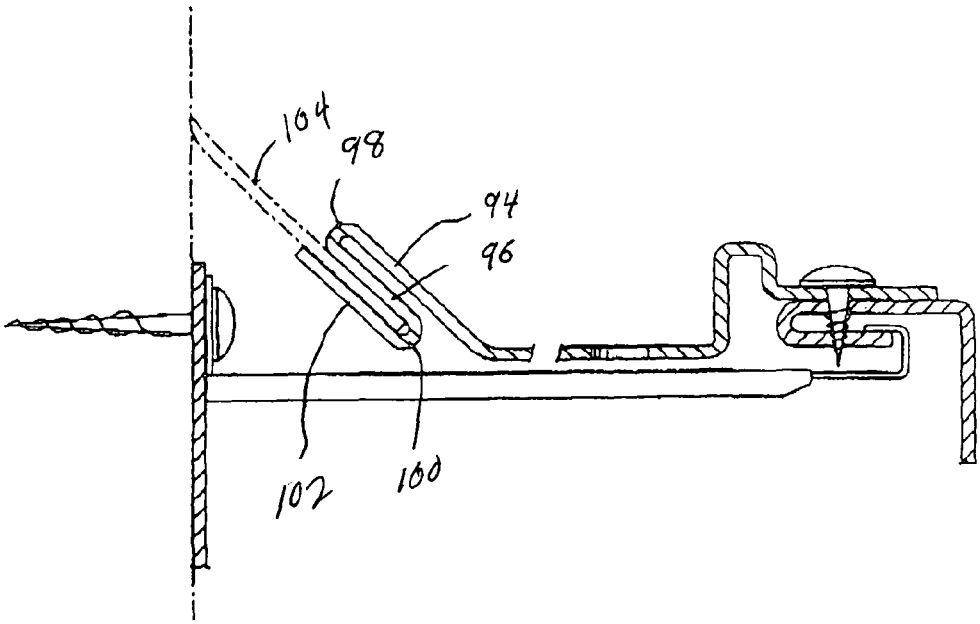
FIG. 7 is a cross-sectional view of a further embodiment of the present invention.

Turning to FIG. 7, there is illustrated another arrangement wherein there is provided a first upwardly extending portion 94 from planer central portion. Upwardly extending portion 94 reverses itself in a U-shaped configuration to provide an underlying portion 96 joined by means of bight 98. A further bight 100 leads into a third section 102. Between sections 96 and 102, there is provided a U-shaped portion arranged to accept a sealing strip 104.

It will be understood that the above described embodiments are for purposes of illustration only and changes and modifications may be made thereto without departing from the spirit and scope of the invention.

I claim:

1. A device to protect a gutter wherein the gutter has a rear wall, a front wall, and a bottom wall, said walls defining a trough there between, said device comprising:

a guard member having an elongated configuration with a generally planar central portion, first and second longitudinally extending sides located on either side of said generally planar central portion, a plurality of apertures extending through said generally planar central portion;

a longitudinally extending flexible sealing member secured to said first side of said guard member, said flexible sealing member extending upwardly and outwardly therefrom;

[a member having first and second ends, said first end of said member abutting said rear wall of said gutter, said second end of said member having a hook shaped configuration;]

said first side of said guard member including a U-shaped portion, said sealing member [being] *having a first side securely* retained between [wall of] *first and second walls forming* said U-shaped portion [and], *a second side of said sealing member being free,* said second side of said guard member having an overflow wall extending generally vertically upwardly, and a horizontal portion extending outwardly from an upper end of said overflow wall, said horizontal portion being designed to rest on said gutter.

2. The device of claim 1 wherein said apertures are arranged in diagonal rows extending between said first and second longitudinally extending opposed sides.

3. The device of claim 2 wherein said apertures are circular in configuration and have a diameter of between 2.5 and 10 mm.

4. The device of claim 1 wherein said first side of said guard member has a vertically extending wall, said vertically extending wall merging with [an inwardly extending] *said* U-shaped portion, *to form an inwardly extending U-shaped portion,* said sealing member being retained by said *inwardly extending* U-shaped portion.

5. The device of claim 1 wherein said first side of said guard member has an upwardly and outwardly angled wall portion, said *inwardly extending* U-shaped portion merging with said upwardly and outwardly extending *wall* portion[, said U-shaped portion retaining said sealing member].

6. In combination an eavestrough having a rear wall, a front wall, a bottom wall, said walls defining a trough therebetween, and an inwardly extending portion located adjacent said front wall, a recess defined by said inwardly extending portion, and;

a guard member having an elongated configuration with a generally planar central portion, first and second longitudinally extending sides located on either side of said generally planar central portion, a plurality of apertures extending through said generally planar central portion;

a longitudinally extending flexible sealing member secured to said first side of said guard member, said flexible sealing member extending upwardly and outwardly therefrom;

[a member having first and second ends, said first end of said member being secured to said rear wall of said gutter, said second end of said member having a hook shaped configuration engaging said recess of said eavestrough;]

said first side of said guard member including a U-shaped portion, *a first side of* said sealing member being retained between *first and second* walls [of] *defining* said U-shaped portion; [and] *a second side of said sealing member being free to abut an adjacent vertical surface in a non secured manner;* said second side of said guard member having an overflow wall extending generally vertically upwardly, and a horizontal portion extending outwardly from an upper end of said overflow wall, said horizontal portion being designed to rest on said eavestrough.

7. The combination of claim 6 wherein said first side of said guard member has an upwardly and outwardly angled wall portion, said U-shaped portion merging with said upwardly and outwardly extending portion.

8. The combination of claim 7 further including a plurality of threaded fastening members, said threaded fastening members securing said horizontal portion extending outwardly from [an] *the* upper end of said overflow wall to said eavestrough.

* * * * *